(12) United States Patent
Buender

(10) Patent No.: US 9,644,718 B2
(45) Date of Patent: May 9, 2017

(54) SHIFT ARRANGEMENT FOR A MOTOR VEHICLE TRANSMISSION AND METHOD FOR ACTUATING SAID SHIFT ARRANGEMENT

(71) Applicant: GETRAG Getriebe-und Zahnradfabrik Hermann Hagenmeyer GmbH & Cie KG, Untergruppenbach (DE)

(72) Inventor: Carsten Buender, Stuttgart (DE)

(73) Assignee: GETRAG Getriebe-und Zahnradfabrik Hermann Hagenbeyer GmbH & Cie KG (DE)

( * ) Notice: Subject to any disclaimer, the term of this patent is extended or adjusted under 35 U.S.C. 154(b) by 107 days.

(21) Appl. No.: 14/554,755

(22) Filed: Nov. 26, 2014

(65) Prior Publication Data
US 2015/0152944 A1    Jun. 4, 2015

(30) Foreign Application Priority Data
Dec. 3, 2013    (DE) .................. 10 2013 018 103

(51) Int. Cl.
*B60K 20/00* (2006.01)
*F16H 59/04* (2006.01)
(Continued)

(52) U.S. Cl.
CPC ............ *F16H 21/08* (2013.01); *F16H 37/12* (2013.01); *F16H 63/304* (2013.01);
(Continued)

(58) Field of Classification Search
CPC ............ F16H 3/006; F16H 3/02; F16H 59/02
(Continued)

(56) References Cited

U.S. PATENT DOCUMENTS

| | | | |
|---|---|---|---|
| 4,449,416 A | * | 5/1984 | Huitema ............... F16H 63/304 192/103 R |
| 7,093,511 B2 | | 8/2006 | Norum |

(Continued)

FOREIGN PATENT DOCUMENTS

| | | |
|---|---|---|
| CN | 1491328 A | 4/2004 |
| CN | 1711436 A | 12/2005 |

(Continued)

OTHER PUBLICATIONS

German Search Report dated Aug. 11, 2014, 7 pages.

(Continued)

*Primary Examiner* — Ha D Ho
(74) *Attorney, Agent, or Firm* — Reising Ethington P.C.

(57) ABSTRACT

A shift arrangement for a motor vehicle transmission has a housing. At least two push rods are mounted on the housing so as to be movable in an axial direction between a neutral position and a shift position. The push rods can each be coupled to a shift clutch. At least two return rods are mounted on the housing. The return rods are each coupled to one of the push rods so that a push rod and the return rod associated therewith are moved in opposite axial directions. A shift cam of a shift member can be aligned with a push rod or with a return rod for the purpose of selecting, and can transmit a pushing force to a selected rod. A driving feature is arranged on the shift member and can transmit a pushing force in order to move an unselected rod into the neutral position.

13 Claims, 7 Drawing Sheets

(51) Int. Cl.
- *F16H 21/08* (2006.01)
- *F16H 63/30* (2006.01)
- *F16H 37/12* (2006.01)
- *F16H 63/02* (2006.01)

(52) U.S. Cl.
CPC .......... *F16H 2063/025* (2013.01); *F16H 2063/3053* (2013.01); *F16H 2063/3063* (2013.01); *Y10T 74/19251* (2015.01); *Y10T 74/19279* (2015.01)

(58) Field of Classification Search
USPC .......... 74/330, 335, 337.5, 473.3, 473.36
See application file for complete search history.

(56) References Cited

U.S. PATENT DOCUMENTS

| | | | |
|---|---|---|---|
| 7,353,726 B2 | 4/2008 | Beer et al. | |
| 7,721,615 B2 | 5/2010 | Ehrlich et al. | |
| 7,770,482 B2 | 8/2010 | Waerp | |
| 8,028,600 B2 * | 10/2011 | Kim | F16H 61/688 74/330 |
| 8,505,403 B2 * | 8/2013 | Bowen | F16H 61/688 74/335 |
| 2004/0112158 A1 | 6/2004 | Norum | |
| 2006/0150761 A1 | 7/2006 | Beer | |
| 2006/0201269 A1 | 9/2006 | Maillard | |
| 2006/0266141 A1 * | 11/2006 | Ogami | F16H 3/006 74/325 |
| 2008/0105075 A1 | 5/2008 | Waerp | |
| 2008/0132371 A1 | 6/2008 | Ehrlich | |
| 2010/0242657 A1 | 9/2010 | Shintani | |

FOREIGN PATENT DOCUMENTS

| | | |
|---|---|---|
| CN | 101142426 | 3/2008 |
| CN | 101846184 A | 9/2010 |
| DE | 10253471 A1 | 8/2004 |
| DE | 102008030238 A1 | 12/2009 |
| DE | 102010012752 A1 | 9/2010 |
| DE | 102009050150 A1 | 4/2011 |
| EP | 1556637 B1 | 10/2003 |
| EP | 1556637 A1 | 7/2005 |
| FR | 2938938 A1 | 5/2010 |
| GB | 2394261 A | 4/2004 |
| WO | WO2002066870 A1 | 8/2002 |
| WO | WO2004038261 A1 | 5/2004 |
| WO | WO2006076877 A1 | 7/2006 |
| WO | WO2006097073 A1 | 9/2006 |

OTHER PUBLICATIONS

European Search Report dated Sep. 15, 2015, 9 pages.
Chinese Office Action for Application No. 201410721386.5 Dated Jul. 4, 2016, 10 pages.

* cited by examiner

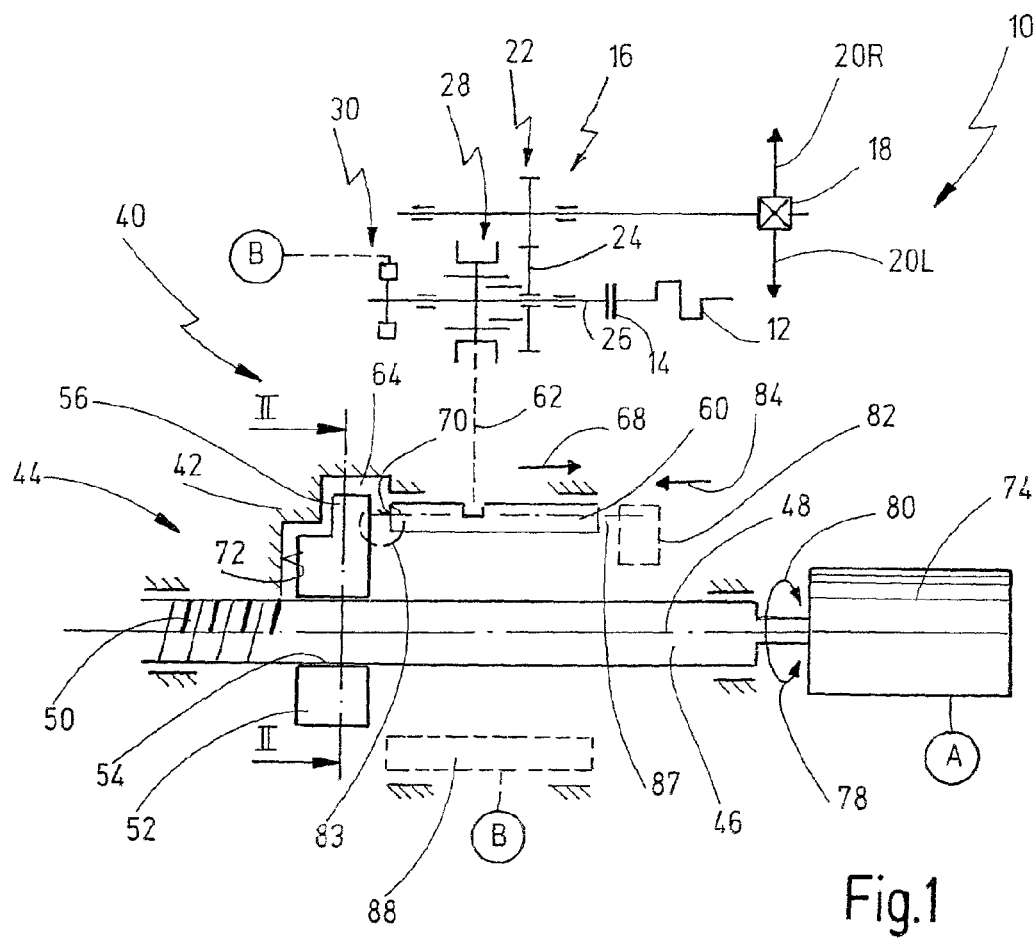
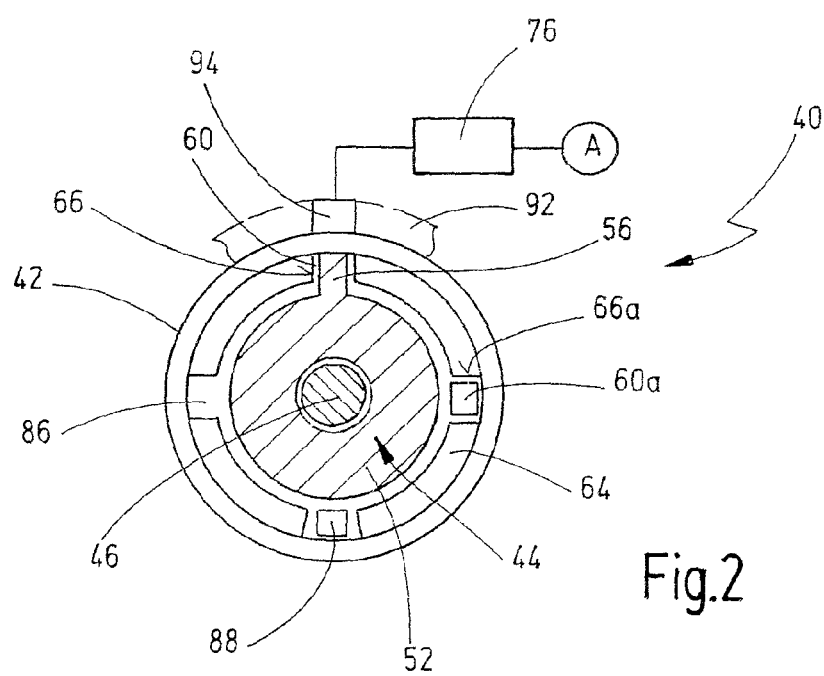
Fig.1
Fig.2

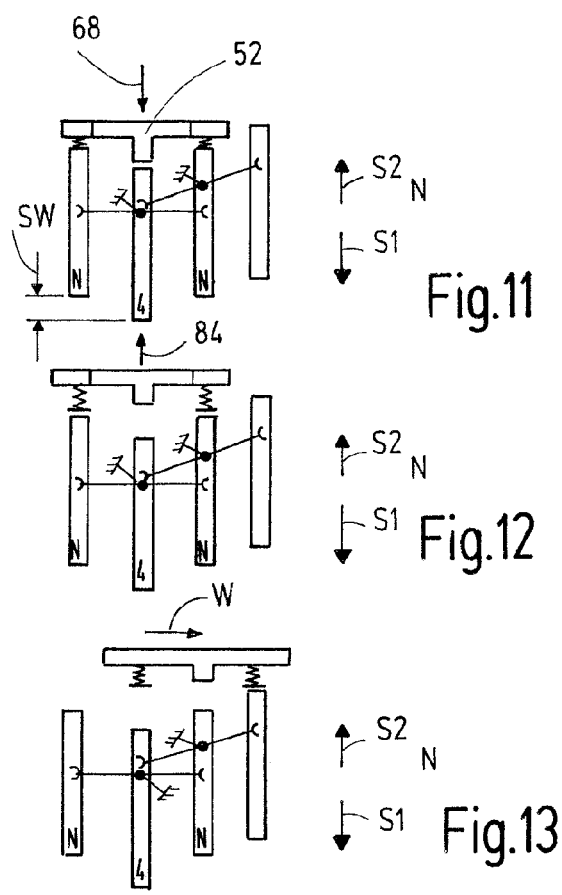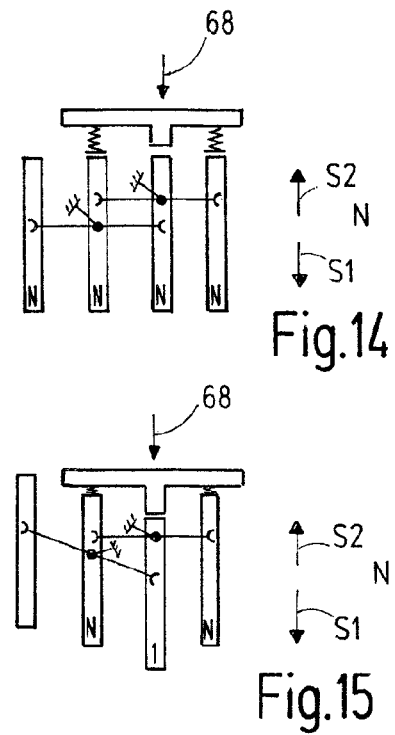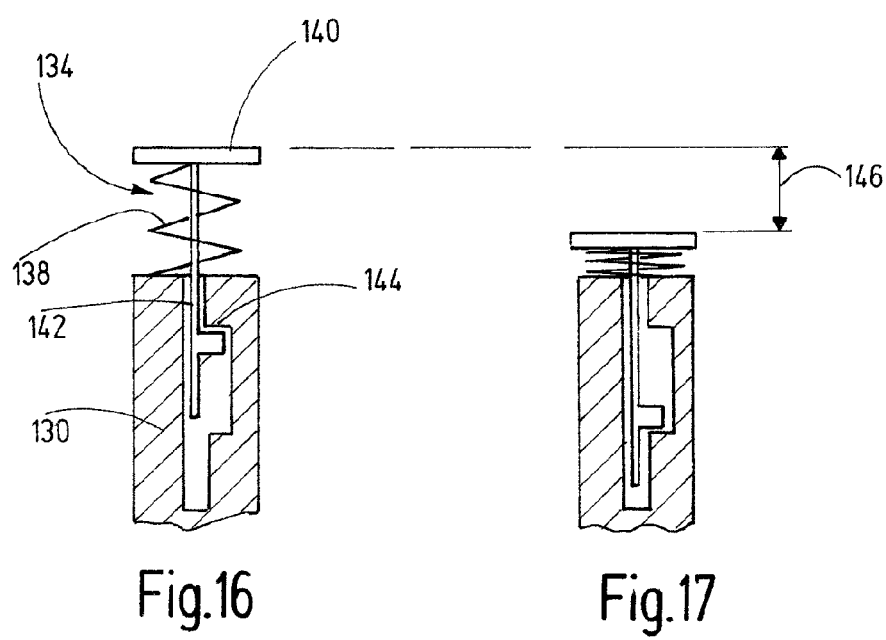

SHIFT ARRANGEMENT FOR A MOTOR VEHICLE TRANSMISSION AND METHOD FOR ACTUATING SAID SHIFT ARRANGEMENT

CROSS REFERENCES TO RELATED APPLICATIONS

This application claims the priority of German patent application DE 10 2013 018 103.8 filed Dec. 3, 2013.

BACKGROUND OF THE INVENTION

The present invention relates to a shift arrangement for a motor vehicle transmission which has at least two gear stages, which can be engaged and disengaged by means of different rods.

The present invention furthermore relates to a method for actuating a shift arrangement of a motor vehicle transmission which has at least two gear stages.

Shift arrangements of this kind are known in the prior art. In general, a motor vehicle transmission has one shift clutch pack for every two gear stages, said pack consisting of two shift clutches, which can be actuated by means of a common sliding sleeve. In this case, the shift clutches can be claw clutches but are preferably synchronizing shift clutches. The motor vehicle transmission is preferably a spur gear transmission of layshaft construction.

In a conventional shift arrangement, each sliding sleeve is coupled to a shift rod. The shift rods each have grooves, in which a shift finger fixed on a shift shaft can engage. Here, the shift shaft can be arranged parallel to the shift rods. In this case, turning the shift shaft leads to a selecting operation, in which a particular shift rod is selected, and longitudinal movement of the shift shaft leads to a shifting operation, in which a shift clutch associated with the shift rod is actuated. Arranging the shift shaft transversely to such shift rods is also known. In this case, selecting is performed by a longitudinal movement of the shift shaft, and the shifting operation is initiated by a process of turning the shift shaft.

Equipping shift shafts with a plurality of shift fingers, each assigned to one shift fork, is also known. The shift forks each engage in associated sliding sleeves of shift clutch packs. Here, the shift rod is generally moved axially for shifting and is turned to select a shift fork. Providing each shift clutch on a shift shaft of this kind with a plurality of shift fingers arranged axially offset one behind the other is also known in this context. This makes it possible to leave one gear stage engaged and to engage a further gear stage. This is relevant particularly in the area of dual clutch transmissions. Dual clutch transmissions have two transmission sections, of which in each case one is used actively for power transmission and the other is inactive. A "following" gear stage is then generally preselected in the inactive transmission section, allowing a gear change from the source gear stage to the following gear stage to be performed by overlapping actuation of two friction clutches.

For automated shift transmissions and dual clutch transmissions, it is also a known practice to provide a dedicated actuator for each of the shift rods, allowing the shift clutch packs to be actuated independently of one another.

The practice of using shift drums to actuate shift clutches is furthermore known in the vehicle transmission sector. Here, the shift drums have a shift drum contour in which a driving feature connected to a shift fork engages in such a way that rotary motions of the shift drum can be converted into axial motions of the shift fork. A known practice in the area of dual clutch transmissions is to assign each transmission section a dedicated shift drum. However, it is also possible to operate the two transmission sections by means of just one single shift drum. In the latter case, disadvantages in terms of shifting time arise from the sequential shift sequence. Moreover, the resulting diameter of the individual shift drum is very large, and therefore the shift arrangement occupies a relatively large space within the transmission housing.

SUMMARY OF THE INVENTION

Given the above background situation, it is an object of the invention to indicate an improved shift arrangement and an improved method for actuating a shift arrangement.

On the one hand, this object is achieved by a shift arrangement for a motor vehicle transmission which has at least two gear stages that can be engaged and disengaged by means of different rods, having a housing; having at least two push rods, which are mounted on the housing in such a way as to be movable in an axial direction between a neutral position and at least one shift position and which can each be coupled to a shift clutch or a shift clutch pack; having at least two return rods, which are mounted on the housing in such a way as to be movable in an axial direction between a neutral position and at least one shift position, wherein the return rods are each coupled to one of the push rods in such a way that a push rod and the return rod associated therewith are moved in opposite axial directions; and having a shift member, which is mounted on the housing in such a way that a shift cam of the shift member can be aligned with a push rod or with a return rod for the purpose of selecting, and can transmit a pushing force to the selected rod and move it in a first axial direction for a shift operation, wherein at least one driving feature is furthermore arranged on the shift member in such a way that, before or during a shift operation on a selected rod, the driving feature can transmit a pushing force to an unselected rod in order to move said unselected rod into the neutral position.

Here, one of the rods can also be assigned to a parking lock arrangement (e.g. as a park-by-wire parking lock).

In a corresponding way, the above object is achieved by a method for actuating a shift arrangement of a motor vehicle transmission, which has at least two gear stages, in particular a shift arrangement of the abovementioned type, wherein the shift arrangement has at least two rods, which can be moved in an axial direction and are each coupled to a shift clutch, and a shift member having a shift cam and having at least one driving feature, wherein the shift cam is first of all aligned with a rod and then moves the rod axially in order to engage a target gear stage, wherein the driving feature ensures that another rod is moved into a neutral position or remains in said position during the axial movement of the shift member.

In the shift arrangement according to the invention, the push rods can each be coupled to a shift clutch or a shift clutch pack, wherein a shift clutch pack generally contains two shift clutches, which can be actuated by means of a sliding sleeve or the like. In the case of coupling to a shift clutch pack, one shift clutch of the shift clutch pack can generally be actuated by means of a push rod by a pushing force being transmitted to said push rod. The other shift clutch of this shift clutch pack can be actuated by exerting a pushing force on the return rod associated with the push rod, wherein the coupling to the push rod means that the return rod is configured to actuate the other shift clutch of the shift clutch pack.

It is consequently preferred if shift operations in the shift arrangement are accomplished exclusively by pushing movements, in which the shift cam exerts a pushing force either on a push rod or a return rod.

It is furthermore preferred if the coupling setup during this process between the shift member and the respective rod is accomplished only by the shift cam resting on the selected rod. Consequently, the rod is not taken along by the shift cam during a rearward movement of the shift cam.

In the shift arrangement according to the invention, it is preferably possible to engage and disengage the at least two gear stages by means of just one shift motor, wherein the shift motor is preferably designed to turn the shift member. In particular, it is preferred if the shift member is designed as a nut, which forms a spindle drive with a spindle, which can be formed by a conventional screw and a nut, for example, but can also be formed by a ball screw.

In this case, the shift motor can be an electric motor, for example, which is simple to control.

The push rods and return rods are preferably mounted on the housing in such a way that they can be moved along respective shift axes, which are preferably aligned parallel to a spindle axis. The shift axes are preferably arranged parallel to shafts of the motor vehicle transmission.

It is furthermore preferred if the plurality of rods is mounted on the housing in such a way that the rods can be moved parallel to one another, being distributed around the spindle axis or longitudinal axis.

Each of the push rods is preferably assigned to an axial guide, which is connected axially to a circumferential groove. The shift cam can preferably be turned in the circumferential groove.

This makes it possible, by turning the shift cam within the circumferential groove, to perform a selecting operation in which the shift cam (which can also be referred to as a shift finger) is aligned with a target rod. During this selecting operation, the nut is preferably not held fast in the circumferential direction, with the result that it rotates along with the spindle. In order then to actuate the selected rod axially, the nut or the shift member is held fast in the circumferential direction, ensuring that, given a suitable direction of rotation of the spindle, the nut enters the axial guide and is held there in the circumferential direction in order in this way to move the push rod in the first axial direction.

The selecting and the shifting function of a shift arrangement for a motor vehicle transmission are consequently preferably implemented in such a way that, in the case of a spindle drive, the nut is either blocked from turning relative to the spindle, in order in this way to introduce an axial movement of the nut on the spindle. If, on the other hand, there is no blocking of the nut in respect of turning of the spindle or if there is indeed blocking (fixing) on the spindle, the nut rotates with the spindle. Consequently, these two types of motion can be used for the selecting and the shifting functions.

A shift arrangement of this kind can be of compact construction both in the axial and in the radial direction, in particular significantly more compact than a single shift drum that has to actuate a plurality of gear stages.

Moreover, short shifting times can be achieved. In addition, there is a largely free choice of shift sequence in contrast to a shift arrangement having a single shift drum.

It is furthermore possible in several embodiments, by means of the shift arrangement, to engage two gear stages simultaneously, and therefore the shift arrangement is suitable, in particular, also for use in combination with dual clutch transmissions.

The position of the nut is preferably measured by means of a suitable sensor arrangement. The sensor arrangement can contain an incremental sensor, for example, and preferably has a zero point sensor in addition, allowing the spindle drive to be calibrated in a simple manner, especially after a reset of a control unit. It is furthermore possible to provide sensors to detect the axial position of at least one of the rods.

According to the invention, it is possible, by means of the driving feature arranged on the shift member, to move an unselected rod into the neutral position during or before a shift operation.

This makes it possible to carry out shift operations significantly more quickly.

In particular, it is possible, within a transmission segment (in particular within an automated shift transmission or within a transmission section of a dual clutch transmission) to use a single axial movement of the shift member to perform both the actual shift operation (engagement of a gear stage) and a disengagement operation of a gear stage that may have been engaged previously.

Consequently, multiple shifts in the same transmission section can be performed significantly more quickly in dual clutch transmissions since the disengagement and engagement operation are functionally connected.

In particular, the number of gear stages can be greater than four and, in the case of a dual clutch transmission, can comprise eight gear stages (seven forward gear stages and one reverse gear stage), for example, or even more than seven forward gear stages. It is also possible, if appropriate, to provide a dedicated push rod for actuating a parking lock arrangement. This push rod then preferably has contact only with the shift cam (engagement cam) but not with the driving feature or features.

Thus, the object is achieved in full.

In the shift arrangement according to the invention, it is particularly preferred if two driving features are arranged on the shift member in such a way that, before or during a shift operation on a selected rod, the driving features can transmit a pushing force to an unselected rod and to the return rod associated therewith in order to move them into the neutral position.

By means of this measure, it is possible to ensure that all unselected push rods and return rods associated therewith within a transmission segment (e.g. an automated shift transmission or a transmission section of a dual clutch transmission) are moved into the neutral position, in particular before the shift clutch associated with the selected rod is closed.

It is self-evident that it is also possible, if appropriate, for more than two driving features to be arranged on the shift member, especially if more than two push rods and associated return rods are provided in the respective transmission segment. In particular, it is also possible for several pairs of driving features to be provided on the shift member in order in each case to move push rods and associated return rods into the neutral position during a shift operation.

In general terms, it is conceivable for the driving features to be designed as rigid driving features which strike directly against the respectively unselected push rod and/or the return rod associated therewith in order to transmit a pushing force.

However, it is particularly advantageous if the driving feature or features are each connected to a spring device, wherein the spring device is arranged and designed in such a way that the pushing force is transmitted from the driving feature to the unselected rod and/or the rod associated therewith via the spring device.

By means of this measure, it is possible, in particular, to move the unselected rod and the rod associated therewith into the neutral position by means of the force of the spring device(s) before the shift cam moves the selected rod in an axial direction in such a way that a target gear stage is engaged. Consequently, this increases functional reliability.

In this case, the spring devices can deflect somewhat, if appropriate, even as the unselected rod(s) is (are) transferred, this being without a functional disadvantage however.

In all cases, the spring devices are preferably dimensioned in such a way that disengagement of at least an "old" source gear stage is reliably possible.

It is particularly advantageous here if the spring travel of the spring device is equal to or greater than the travel of a rod from the neutral position to the shift position.

It is thereby possible for the spring device to be compressed from the time at which the shift cam touches the selected rod until the shift cam has moved the selected push rod into the shift position.

According to another preferred embodiment, the spring device and the shift cam are arranged relative to one another in such a way, as seen in the axial direction, that a pushing force is transmitted from the driving feature or driving features to the unselected rod or rods via the spring device before the shift cam exerts a pushing force on the selected rod, thus ensuring that a shift clutch of a source gear stage is opened before a shift clutch of a target gear stage associated with the selected rod is closed.

In particular, it is preferred here if the spring device projects axially relative to the shift cam in an axial direction towards the rods in the uncompressed state.

It is furthermore preferred if at least one other push rod or return rod is arranged between a push rod and a return rod associated therewith, as seen in a direction transverse to the axial direction.

It is thereby possible to exert an axial force on the other push rod or return rod, for example, by means of the shift cam, and the driving features can transmit pushing forces to the push rod and the return rod associated therewith.

It is furthermore advantageous overall if the shift member can be turned about a longitudinal axis for the purpose of selecting, wherein the push rods and the return rods are arranged in a manner distributed in the circumferential direction around the longitudinal axis.

In general terms, it is admittedly also conceivable to arrange the push rods and return rods in one plane. However, the preferred embodiment allows, in particular, the use of a spindle drive for driving the shift member.

It is particularly preferred here if the push rod and the return rod associated therewith are arranged diametrically in relation to the longitudinal axis.

This makes it possible to implement the coupling between the push rod and the return rod associated therewith in a structurally advantageous manner.

As mentioned above, the motor vehicle transmission can be an automated shift transmission which has just one starting coupling, i.e. not a dual clutch transmission.

In this case, it is advantageous if the shift member has a driving feature for all the unselected push rods and the return rods associated therewith, with the result that, when one gear stage is engaged, all the other gear stages of the motor vehicle transmission are locked by means of the driving features.

In this embodiment, it may be possible to dispense with a separate gear locking mechanism, which is otherwise necessary to hold the unselected push rods or the return rods thereof in a neutral position.

According to another variant, the motor vehicle transmission is a dual clutch transmission, which has a first transmission section and a second transmission section, wherein the shift arrangement has push rods and return rods for both transmission sections, which can be actuated by means of the one shift member.

In this case, the first transmission section preferably has uneven or even gear stages, and the other transmission section preferably has even or uneven gear stages.

The general mode of operation of dual clutch transmissions is widely known and is therefore not described in greater detail here.

Fundamentally, however, it is possible for one gear stage in each of the two transmission sections to be engaged simultaneously, although power is transmitted only via one of the gear stages, whereas the other gear stage is preselected, allowing subsequent gear changes to be performed substantially without an interruption in the tractive force.

It is advantageous here if the shift member can be turned about a longitudinal axis for the purpose of selecting, wherein the push rods and the return rods are arranged in a manner distributed in the circumferential direction around the longitudinal axis, wherein, as seen over the circumference, one push rod or return rod of one transmission section is adjacent to one push rod or return rod of the other transmission section.

It is thereby possible to use the driving feature or features, when engaging a target gear stage in a transmission section, to disengage the other gear stages of the same transmission section. This furthermore makes it possible to ensure that, during such a combined engagement and disengagement operation in one transmission section, the shift position of the gear stages of the other transmission section are not affected. In this case, it may be preferred to provide separate gear locking mechanisms for the transmission sections.

To ensure that the shift member (the nut) in the abovementioned spindle drive is forced to turn for the purpose of selecting, a stop is preferably provided, which holds the nut axially, ensuring that it is forcibly turned.

It is furthermore particularly advantageous if the stop is assigned a one-way clutch device, which allows turning of the nut in a first direction of rotation and blocks turning in the other direction of rotation in at least one predetermined rotational position.

In the shift arrangement according to the invention, the shift actuation can be implemented, in particular, by means of a single electric motor.

Overall, it is possible with the shift arrangement according to the invention and the method according to the invention to achieve the aim of implementing shift actuation, in particular by electric motor, by means of a single electric motor. The shift arrangement is suitable particularly for dual clutch transmissions. Moreover, short shifting times can be achieved. Moreover, it is possible to a large extent to achieve free shift sequences. Finally, the shift arrangement can be implemented in an extremely compact way, both in the radial and in the axial direction, resulting in only low packaging requirements within the transmission housing. Moreover, the shift arrangement can be produced at low cost.

In general terms, it is possible, through suitable connections of push rods of a transmission section, to prevent engagement of more than one gear stage in a transmission section. Moreover, in the case of a transmission which is not designed as a dual clutch transmission, such gear locking can achieve gear locking in respect of all the gear stages of the transmission, ensuring that only one single gear stage can be engaged.

In general terms, it is furthermore possible in the case of the dual clutch transmission to move push rods in the same transmission section into a neutral position during the engagement of a gear stage in the same transmission section. As a result, it is not necessary to disengage a gear in the same transmission section but on a different push rod, this being accomplished by actuating the currently actuated push rod.

Whereas it has been assumed in general terms in the above embodiments that the nut "pushes" the push rod in an axial direction, it is self-evident that, given suitable mechanical design, "pulling" of a push rod is also possible in order to obtain movement of the push rod in the first axial direction.

It is self-evident that the features mentioned above and those which will be explained below can be used not only in the respectively indicated combination but also in other combinations or in isolation without exceeding the scope of the present invention.

BRIEF DESCRIPTION OF THE DRAWINGS

Exemplary embodiments of the invention are represented in the drawings and are explained in more detail in the following description. In the drawings:

FIG. 1 shows a schematic illustration of a motor vehicle drive train having a schematically illustrated embodiment of a shift arrangement;

FIG. 2 shows a schematic illustration along a section line II-II in FIG. 1;

FIG. 11 shows the shift arrangement of FIG. 10 after engagement of gear stage 4;

FIG. 12 shows the shift arrangement of FIG. 10 after a return movement of the shift member;

FIG. 13 shows the shift arrangement of FIG. 10 after a choosing operation for selecting gear stage 1;

FIG. 14 shows the shift arrangement of FIG. 10 after a movement of the push rod of gear stage 4 and of the return rod associated therewith into the neutral position;

FIG. 15 shows the shift arrangement of FIG. 10 after engagement of gear stage 1;

FIG. 16 shows a schematic sectional view through a driving feature with an associated spring device in the uncompressed state;

FIG. 17 shows an illustration comparable to FIG. 16 with the spring device compressed;

DESCRIPTION OF PREFERRED EMBODIMENTS

Figure 3:
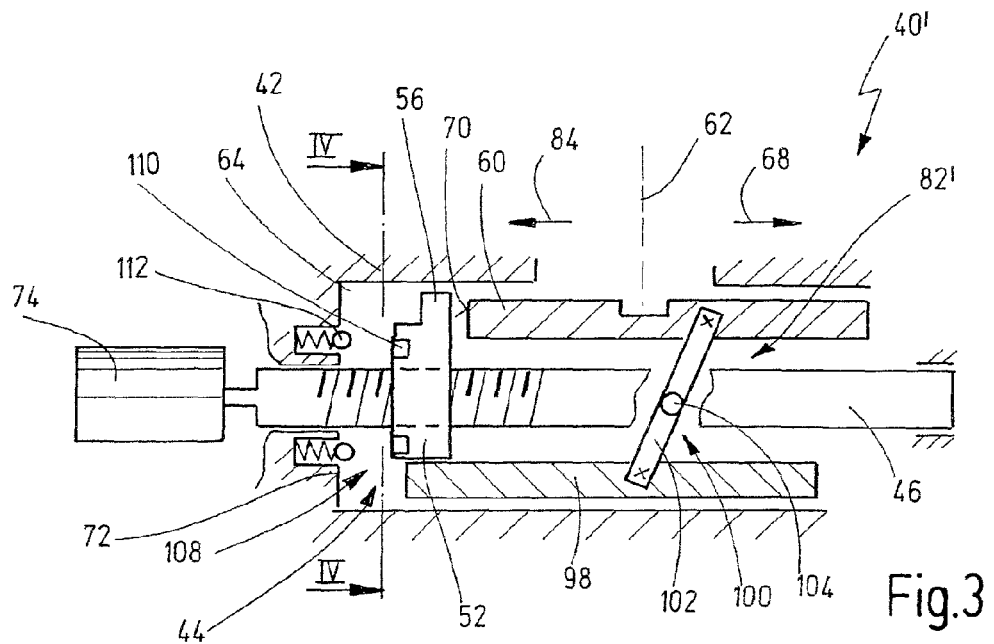
FIG. 3 shows a view comparable to FIG. 1 of another embodiment of a shift arrangement.

In FIGS. 1 and 2, a drive train for a motor vehicle is illustrated schematically and denoted overall by 10. The drive train 10 contains a drive motor 12, e.g. an internal combustion engine, the drive shaft of which is connected to a clutch arrangement 14. An output of the clutch arrangement 14 is connected to a transmission arrangement 16. An output of the transmission arrangement 16 is connected to a differential 18, by means of which motive power is distributed between two driven wheels 20L, 20R. In the present case, the transmission arrangement 16 is indicated only in a schematic way by means of an input shaft and an output shaft, which are connected to one another by a gear set 22. The transmission arrangement 16 is, in particular, a spur gear transmission, in particular a layshaft transmission. In particular, the transmission arrangement 16 can be an automated shift transmission, preferably a dual clutch transmission.

The gear set 22 has a loose gear 24, which is mounted rotatably on a shaft 26 of the transmission arrangement 16. Arranged on the shaft 26 is a shift clutch, which can be of conventional construction, possibly being designed as a claw clutch for example but especially as a synchronizing shift clutch.

The shift clutch 28 has a sliding sleeve (not designated specifically), which can be moved in an axial direction on the shaft 26 in order to connect the loose gear 24 to the shaft 26 for conjoint rotation and in this way to engage a gear stage, or to decouple it from the shaft 26 in order in this way to disengage the associated gear stage. In general, transmission arrangements 16 of this kind have at least one reverse gear stage and at least five forward gear stages, which are each assigned to one gear set and can be actuated by means of a corresponding number of shift clutches.

FIG. 1 furthermore shows that the drive train 10 can have a parking lock arrangement 30, which, for example, contains a parking lock wheel that is connected to one of the shafts (in this case shaft 26) for conjoint rotation. A parking lock wheel of this kind is preferably arranged on a shaft coupled securely for rotation to the differential 18. The parking lock arrangement 30 can have a parking lock pawl (not shown specifically), for example, which can be pivoted between a release position and a parking lock position, wherein in the parking lock position a tooth of the parking lock pawl engages in a recess in the parking lock wheel. A linear motion actuating member can be provided to actuate the parking lock pawl.

For automatic actuation of the shift clutch 28, a shift arrangement 40 is provided, which can be integrated into a housing 42 of the transmission arrangement 16 for example. The shift arrangement 40 contains a spindle drive 44, which has a spindle 46 that is aligned along a spindle axis 48 and has a spindle thread 50 on at least a section of its outer circumference. The spindle axis 48 is preferably aligned parallel to the shaft 26 of the transmission arrangement 16. The spindle drive 44 furthermore contains a nut 52 having a nut thread 54, which is in engagement with the spindle thread 50. The spindle drive 44 can also be designed as a recirculating ball spindle drive, which in general terms can contribute to a reduction in friction and hence to a reduction in the required motor torque of a motor for driving the spindle.

A radially projecting shift cam 56 is formed on an outer circumference of the nut 52, preferably extending over an angular range of less than 20°. The spindle 46 is rotatably mounted on the housing 42.

The shift arrangement 40 furthermore has a push rod 60, which is mounted on the housing 42 in such a way as to be movable parallel to the spindle axis 48. The push rod 60 is aligned with the shift cam 56 in the circumferential direction. The push rod 60 is furthermore coupled to the shift clutch 28 by a suitable coupling 62, e.g. in the form of a shift fork. Axial movements of the push rod 60 consequently lead to axial movement of the sliding sleeve of the shift clutch 28, thus enabling at least one gear stage to be engaged and disengaged by means of the push rod 60.

Formed on the housing 42 is a circumferential groove 64, in which the shift cam 56 of the nut 52 engages in an axial base position, which is illustrated in FIG. 1. In the axial base position, the nut 52 can consequently be turned in the circumferential direction, as can be seen in FIG. 2, for example. In FIGS. 1 and 2, the nut 52 has been turned in such a way that the shift cam 56 is aligned with the push rod 60 in a circumferential direction.

An axial guide 66, which is designed as a kind of shift cam gate, is furthermore formed on the housing 42. The shift cam 56 can consequently penetrate axially into the axial guide 66 and is held in the circumferential direction in the axial guide 66. The axial guide 66 can also serve to support the push rod 60, namely in the circumferential direction. For reasons of clarity, support for the push rod 60 in the radial direction is not shown in detail in FIGS. 1 and 2. The circumferential direction is preferably aligned perpendicularly to the axial direction.

If the gear stage associated with the gear set 22 is to be engaged, the spindle 46 is first of all turned in such a way that the nut 52, which is in the axial base position, is turned until the shift cam 56 is aligned with the axial guide 66 in the circumferential direction, as illustrated in FIGS. 1 and 2. By virtue of the nut 52 being held in the circumferential direction, the nut is introduced into the axial guide 66 by driving the spindle 46 in a suitable direction of rotation. As soon as the shift cam 56 engages in the axial guide 66, the nut 52 is held in the circumferential direction by the axial guide 66 and is consequently moved positively towards the push rod 60 in a first axial direction 68 until the shift cam 56 strikes the push rod 60 and takes it along in the first axial direction 68 in order in this way to actuate the shift clutch 28. For this purpose, a contact surface 70, on which the shift cam 56 engages, is formed on an axial end face of the push rod 60.

The housing 42 furthermore has an axial stop 72 for the nut 52, wherein the axial stop 72 defines the axial base position. When, after moving the push rod 60, the nut 52 is consequently moved in the opposite direction, more specifically by the spindle being driven in the opposite direction, the shift cam 56 therefore ultimately emerges from the axial guide 66, and the nut then comes into contact with the contact surface 70, and the nut can thus be turned in the axial base position by turning the spindle 46, while the shift cam 56 runs through the circumferential groove 64.

FIG. 2 shows that a plurality of push rods 60 can be arranged on the housing 42 in a manner distributed in the circumferential direction (in this case push rods 60 and 60*a*). Push rod 60*a* is assigned a corresponding axial guide 66*a*. After the nut 52 has been turned in such a way that the shift cam 56 is aligned with push rod 60*a*, it too can be moved in an axial direction in order to engage a gear stage assigned to the further push rod 60*a*.

Typically, a push rod 60 is in each case assigned to a sliding sleeve, which can actuate one or two shift clutches of a shift clutch pack in the manner known in the prior art. Consequently, a dedicated push rod 60, 60*a* . . . is preferably to be provided for every two gear stages.

FIG. 1 shows a shift motor 74, which can be designed as an electric motor, for example, and the drive shaft of which is connected rigidly to the spindle 46, wherein the shift motor 74 can be activated by means of a control device 76 in such a way that said motor can be driven in a first direction of rotation 78 or in a second direction of rotation 80.

In order to ensure that the nut is moved in the first axial direction 68, starting from the axial base position, until the shift cam 56 engages in an axial guide 66, it is generally necessary to fix the nut 52 in the circumferential direction. For this purpose, a holding device (not shown specifically in FIGS. 1 and 2), which can be designed as a detent device for example, can be provided. The holding device is preferably designed to hold the nut 52 in the circumferential direction, starting from the axial base position, at least until the shift cam 56 has engaged in the axial guide 66.

Owing to the fact that an axial movement of the push rod 60 is exerted exclusively via a pushing force by means of the shift cam 56, a return device 82 is preferably provided, this being indicated schematically in FIG. 1 and being designed to move the push rod, which has been moved in the first axial direction out of a neutral position, in a second axial direction 84, which is opposed to the first axial direction 68.

By means of the return device 82, it is consequently preferably also possible to move the push rod 60 out of a neutral position, in which the shift clutch 28 and, if appropriate, a shift clutch assigned to the same shift clutch pack is open, in the axial direction 84 opposed to the first axial direction 68 as well in order, for example, to actuate such a second shift clutch of the same shift clutch pack.

By means of the above-described mode of operation of the spindle drive 44, the push rod 60 (or further push rods 60*a*, etc.) is consequently generally moved in the first axial direction 68. By means of the return device 82, the push rod (or the push rods) can each be moved in the opposite, second axial direction 84. Starting from the above-described neutral position, the return device 82 can consequently also serve to actuate a further shift clutch of the same shift clutch pack. In order to re-establish the neutral position from this position of the push rod 60, the spindle drive 44 is once again actuated in the manner described above in order to return the push rod 60 to the neutral position from the second shift position (in the first axial direction).

The return device 82 can be formed by a releasable coupling 83 between the nut 52 and the push rod 60, for example, as indicated schematically in FIG. 1.

A return device 82 can furthermore be obtained by providing on the housing 42 another axial guide 86, although this is not assigned a push rod and is consequently designed as an axial "empty gate". By turning the nut 52 in such a way that the shift cam 56 is aligned with this further axial guide 86, and by turning the spindle in such a way that the shift cam 56 passes through the further axial guide 86 in an axial direction, the nut 52 can consequently be moved to the axial end of the push rod 60 opposite to the axial base position. At this opposite position, therefore, a further circumferential groove 87 is preferably provided for the shift cam 56, this being indicated schematically in FIG. 1. Within the further circumferential groove 87, the shift cam 56 can consequently be turned in the circumferential direction in order to align the shift cam with axial guide 66, for example. If the spindle is driven in a suitable way, the shift cam can then engage in axial guide 66 from the opposite side and can once again move the push rod 60 in push mode in the second axial direction 84. The nut can then be moved back in the first axial direction 68, towards the further circumferential groove 87. The nut 52 can then be turned again until the shift cam 56 is aligned with the further axial guide 86, and the nut is then moved back in the second axial direction 84 towards the first axial base position, which is illustrated in FIGS. 1 and 2.

In this way, each push rod 60, 60a can be actuated exclusively in push mode both in the first and in the second axial direction 68, 84, and thus all the push rods 60, 60a etc. can be moved in both axial directions 68, 84 in order in this way to engage one or more gear stages of the transmission arrangement 16. In particular, it is possible, if the transmission arrangement 16 is formed by a dual clutch transmission, to engage one gear stage in each of the two transmission sections without the need to engage other gear stages in the meantime, as is generally the case with a sequential shift drum.

Overall, it is possible in this way to achieve very short shifting times.

It is self-evident that a pitch of the spindle thread 50 and of the nut thread 54 is set up in such a way that, on the one hand, axial forces required to engage and disengage the gear stages can be transmitted to the push rod. On the other hand, the pitches are set up in such a way that the nut can be actuated relatively quickly in an axial direction, for which purpose the speed of the shift motor 74 can be adjusted in a suitable manner.

It is self-evident that the control device 76 is designed to control the shift motor in any desired manner, both as regards the rotational position and as regards the speed of rotation, in order to be able to obtain the above functions.

In making available the further circumferential groove 87, it is understood that a corresponding axial stop is preferably provided on the housing 42, said stop lying axially opposite the axial stop 72 for the axial base position. A holding device for holding the nut in the region of the further circumferential groove is likewise furthermore provided in order to enable the nut to enter one of the axial guides in a suitable rotational position.

FIGS. 1 and 2 furthermore illustrate schematically that a parking lock push rod 88 can be provided on the housing 42. It is possible for the parking lock push rod 88 to be designed and to be actuable in the same way as each of the push rods 60. Here, as indicated schematically in FIG. 1, the parking lock push rod 88 is coupled to the parking lock arrangement 30, with the result that the shift arrangement can also be used to shift the parking lock arrangement 30 backwards and forwards between a parking lock position and a release position.

In an alternative version, the shift arrangement 40 preferably has just one such parking lock push rod 88 and no push rods, the shift arrangement 40 thus being designed exclusively for actuating the parking lock arrangement.

In this case, however, the shift arrangement can also be constructed in the manner described below with reference to FIG. 9.

The shift arrangement 40 preferably has an incremental sensor 92, by means of which the relative rotational position of the shift cam 56 in relation to the housing 42 can be detected. The incremental sensor 92 is connected to the control device 76. Provision is furthermore preferably made to provide a zero position sensor 94 in one circumferential position, by means of which a predetermined position of the shift cam 56 in the circumferential direction can be determined. The zero position sensor 94 is also preferably connected to the control device 76. Instead of the incremental sensor 92 arranged on the housing 42, it is also possible to use a logic unit which uses an incremental sensor of the shift motor 74 to draw conclusions about the respective current rotational position of the nut 52.

The zero position sensor 94 serves, in particular, to detect a zero position in order in this way to calibrate an incremental sensor, particularly after a reset.

In the case of a reset of the control unit 76, the nut 52 can be moved into the axial base position without having to engage or disengage gear stages for this purpose. The nut 52 can then be turned until the zero position sensor 94 detects the predetermined rotational position of the nut 52 in order in this way to calibrate an incremental sensor.

FIGS. 3 to 8 show another embodiment of a shift arrangement according to the invention, which corresponds in general terms as regards construction and operation to the shift arrangement in FIGS. 1 and 2 and which is denoted by 40' in these figures. Identical elements are indicated by identical reference numerals. It is essentially the differences which are explained below.

Figure 4:
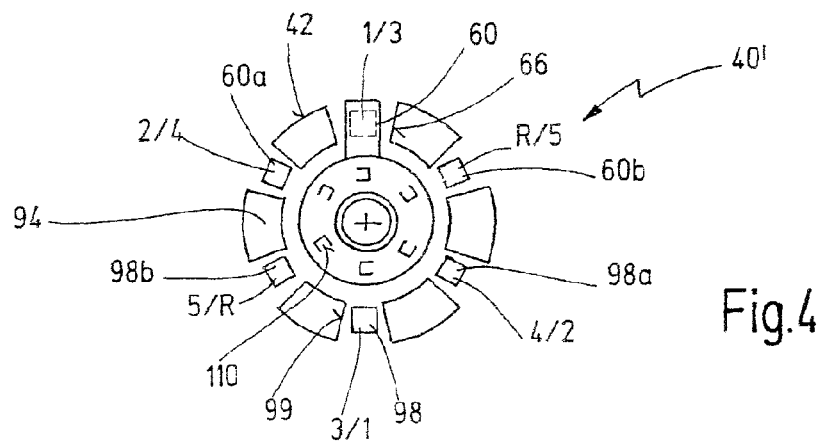
FIG. 4 shows a schematic sectional view along a line IV-IV in FIG. 3.

The shift arrangement 40' has another type of return device 82', which contains a return rod 98. In general terms, the return rod 98 is constructed like a push rod 60 and is mounted on the housing 42 in such a way as to be axially movable in a further axial guide 99. The return rod 98 is provided in direct association with push rod 60. In addition to the first push rod 60, FIG. 4 shows two further push rods 60a, 60b. Each of these push rods 60, 60a, 60b is assigned a return rod 98, 98a, 98b. The return rods 98 are preferably arranged diametrically opposite the associated push rods 60, i.e. on radially opposite sides of the nut 52, as can be seen especially in FIG. 4.

In the embodiment in FIGS. 3 to 8, push rod 60 is assigned to gear stages 1, 3 of a transmission arrangement 16, which can be designed, in particular, as a dual clutch transmission. Push rod 60a is assigned to gear stages 2, 4, and push rod 60b is assigned to gear stages R, 5. Consequently, shift arrangement 40' is suitable for a vehicle transmission with five forward gear stages and one reverse gear stage. In the case of a transmission with six or seven stages, a further push rod would consequently have to be provided in the circumferential direction, and a corresponding number of further push rods would have to be provided in the case of a transmission with even more gear stages.

The push rods 60, 60a, 60b are coupled to their respectively associated return rods 98, 98a, 98b by respective return coupling devices 100. The return coupling devices 100, of which only one is shown in FIG. 3, are designed in such a way that push rod 60 and return rod 98 are each moved in opposite axial directions, such that return rod 98 is moved in the second axial direction 84 when push rod 60 is moved in the first axial direction 68, and vice versa. Consequently, the return coupling device 100 is a kind of counterstroke positive coupling. In the present case, the return coupling device 100 is implemented by means of a lever 102 which extends substantially in a radial direction and can be pivoted on the housing 42, preferably at a pivotal attachment point 104 lying on the spindle axis 48. The two ends of the lever 104 are each connected in an articulated manner to push rod 60 and to the associated return rod 98. Further levers 102, which are shown at 102a and 102b in FIGS. 6 and 7 for example, can be mounted on the housing 42 in a manner offset in an axial direction relative to lever 102.

In the case of the return device 82' in FIGS. 3 to 8, push rod 60 can be moved in the second axial direction 84 and consequently moved back or returned from a position offset in first shifting direction 68 by once again moving the nut 52 into the axial base position and then turning it until the shift cam 56 is aligned with the associated return rod 98. Return rod 98 is then moved in the first axial direction 68, thereby necessarily moving push rod 60 in the second axial direction 84.

It is self-evident that it is thereby possible to establish both a neutral position for push rod 60 and also two shift positions which are associated with a first gear stage and a second gear stage, which can be actuated by means of a shift clutch pack.

Figure 6:
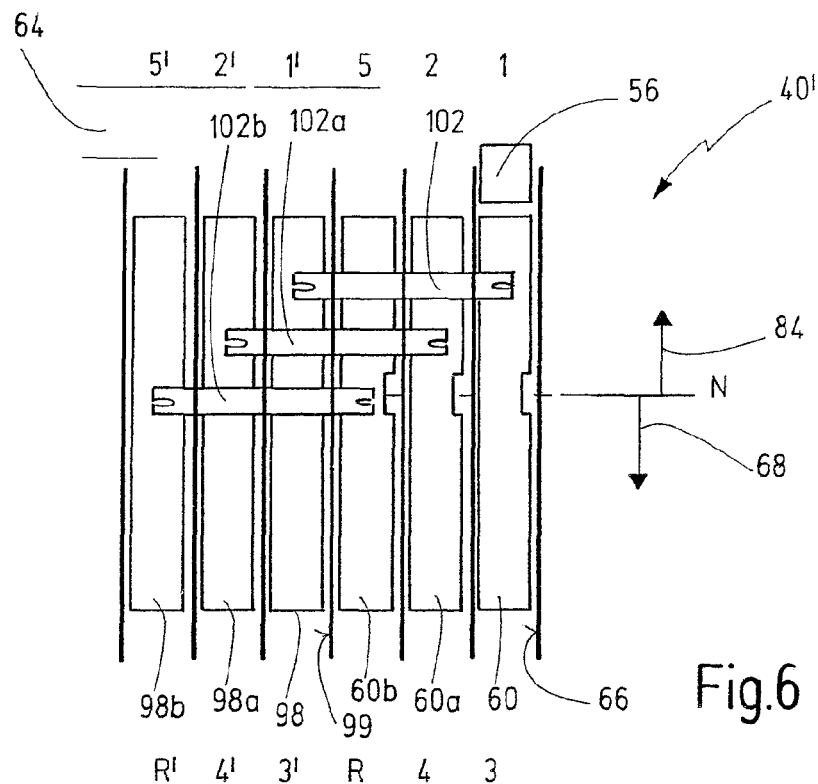
FIG. 6 shows a development of a shift arrangement of the kind shown in FIGS. 3 and 4, wherein all the push rods are in a neutral position.
Figure 7:
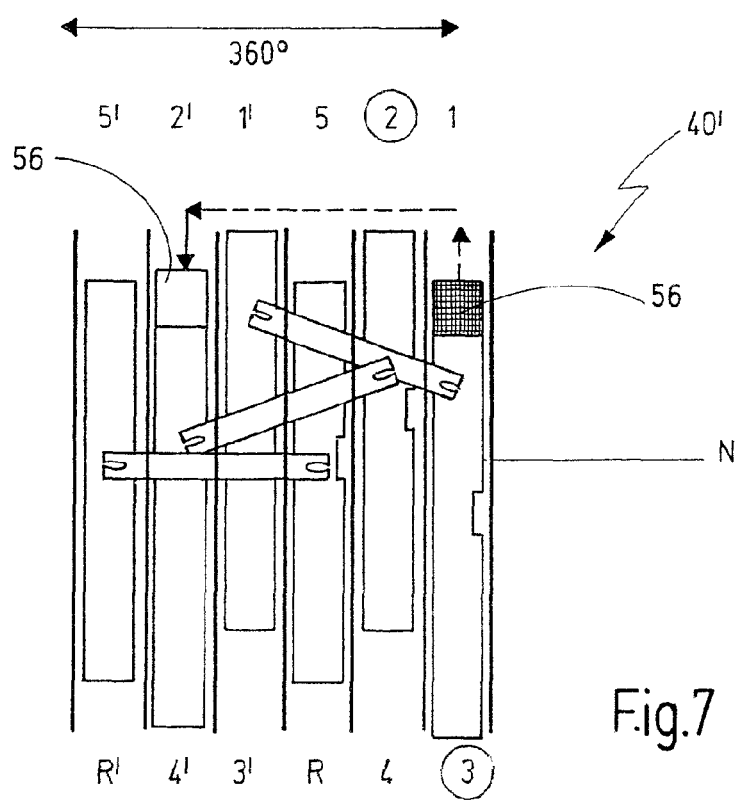
FIG. 7 shows an illustration corresponding to FIG. 6, wherein gear stages 2 and 3 are engaged.
Figure 8:
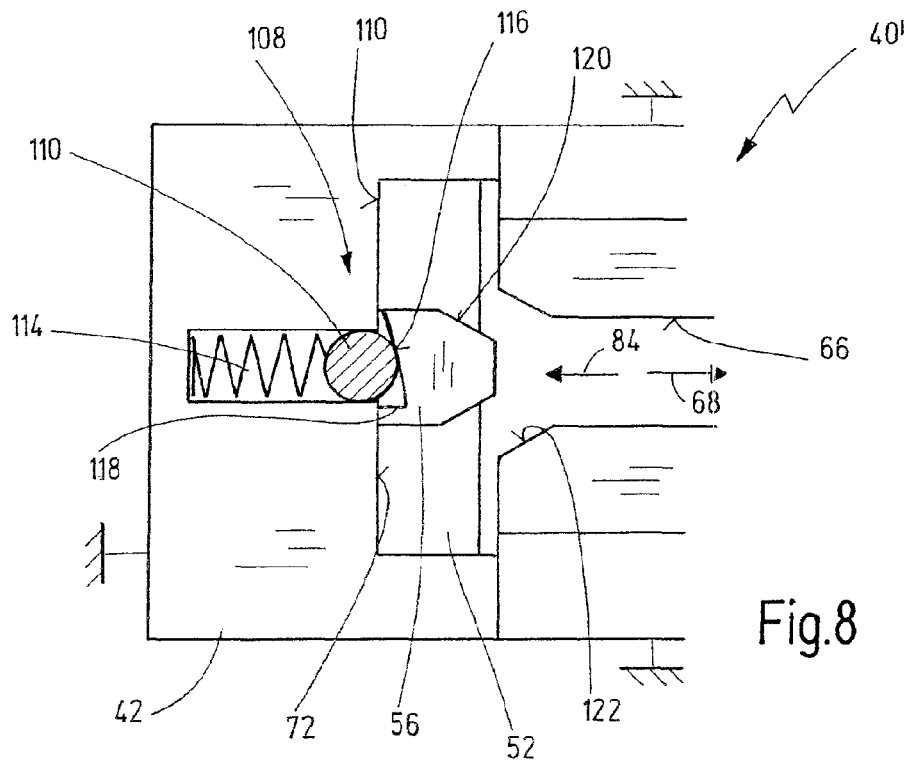
FIG. 8 shows a schematic plan view of a one-way clutch contour of another embodiment of a one-way clutch device for a shift arrangement.

This is shown by way of example in FIGS. 6 and 7, wherein FIG. 6 shows an illustration in which all the push rods 60, 60a, 60b are aligned in the neutral position N thereof. In the illustration in FIG. 6, the shift cam 56 is in the axial guide 66.

Starting from this home position, the shift cam 56 can be moved in the first axial direction 68 by driving the spindle 46 in a suitable direction (depending on the pitch of the spindle thread 50), as a result of which push rod 60 is taken along in the first axial direction in order in this way to engage gear stage 3, this being illustrated in FIG. 7. The associated return rod 98 is thereby moved in the second axial direction 84, this likewise being illustrated in FIG. 7, thereby pivoting the lever 102.

As illustrated by a dashed line in FIG. 7, the nut 52 can then be moved back, namely in the second axial direction 84, by reversing the direction of rotation of the spindle. During this process, push rod 60 remains in the position in which gear stage 3 is engaged.

After reaching the axial base position (corresponding to the circumferential groove 64, which is indicated in FIG. 6) the nut 52 can be moved in a circumferential direction until the shift cam 56 is aligned with return rod 98a. The spindle 46 is then driven again in such a way that the nut 52 is moved in the first axial direction, as a result of which the shift cam 56 moves into the axial guide associated with return rod 98a, said axial guide not being shown specifically in FIG. 7. As a result, return rod 98a is moved in the first axial direction 68, whereby push rod 60a is necessarily moved in the second axial direction 84 by means of lever 102a, thereby engaging gear stage 2, as illustrated in FIG. 7.

In the dual clutch transmission, it is consequently possible, with gear stage 3 engaged in the active transmission section, to preselect gear stage 2 already in order to prepare for a downshift operation. As an alternative, it would also have been possible for push rod 60a to be moved in the first axial direction 68 in order to preselect gear stage 4 in the inactive transmission section and to prepare an upshift operation.

Starting from the illustration in FIG. 7, it is possible, for example, after transferring the motive power to the transmission section associated with gear stage 2, to disengage gear stage 3 again by moving the shift cam 56 initially back into the axial base position, subsequently turning it and then moving return rod 98 in the first axial direction 68 until the neutral position has been reached. The neutral position N can then be maintained or return rod 98 can be moved further in order to engage gear stage 1.

In the embodiment of shift arrangement 40' in FIGS. 3 to 8, it is consequently possible for the nut to be turned exclusively in the basic home position. Here, the provision of an "empty gate" 86 as in FIG. 2 is not necessary. The shifting times can thereby be considerably shortened.

In general terms, it is possible to couple the rods and/or the levers to one another in such a way that gear locking is achieved, preventing the engagement of several gear stages in one transmission section (in the case of a dual clutch transmission) or preventing the engagement of all the other gear stages when one gear stage is engaged (in the case of an automated shift transmission). However, no design details of a gear locking system of this kind are shown in FIGS. 3 to 8.

It is furthermore conceivable in general terms to set up a neutral positioning device which, when one gear stage is engaged in one transmission section, sets the other push rods associated with the same transmission section to a neutral position. As a result, it is unnecessary to disengage a gear stage which is associated with the same transmission section but with a different push rod, this being accomplished by actuating the current push rod.

As described above, it is necessary, in order to turn the nut 52 in the axial base position, for said nut to strike an axial stop 72, which is aligned or associated in an axial direction with the circumferential groove 64. The axial stop 72 is preferably formed on the housing 42 but could also be formed on the spindle 46.

The above description furthermore states that, starting from the axial base position, the nut 52 must initially be held in order to introduce it into one of the axial guides 66, 99.

In the shift arrangement 40' in FIGS. 3 to 8, this is accomplished by means of a one-way clutch device, which is designed as a unilateral detent device.

Figure 5:
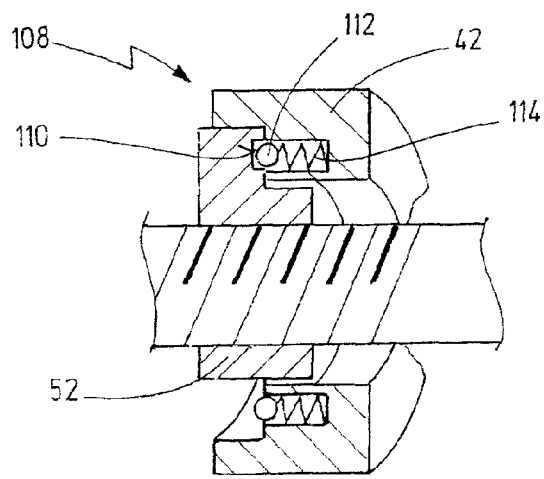
FIG. 5 shows a schematic illustration of a one-way clutch device for the shift arrangement in FIGS. 3 and 4 on an enlarged scale.

In this case, the one-way clutch device 108 is set up between the nut 52 and the housing 42 and, in the present case, contains a one-way clutch contour 110 on an axial end face of the nut 52 which faces the housing. The one-way clutch device 108 furthermore contains a plurality of projections 112, which are preloaded in an axial direction towards the nut 52 by means of respective springs 114 and project in an axial direction relative to the axial stop 72 in a home position. This is illustrated in relatively great detail in FIGS. 5 and 8, in particular. In this case, the projections 112 are arranged in a circumferential direction in such a way that each axial guide 66, 99 is assigned at least one projection 112, preferably two diametrically opposite projections, as illustrated in FIGS. 3 and 5.

In this case, the one-way clutch contour 110 has an oblique contour section 116 and a blocking contour section 118. The mode of operation of the one-way clutch device 108 is clearly evident from FIG. 8, in particular. When the nut strikes the axial stop 72 in an axial direction, the nut is forced to move in a circumferential direction if the spindle is turned further. The one-way clutch contour 110 is designed in such a way that the nut 52 can overrun the projections 112 in the manner of a one-way clutch, more specifically by virtue of the oblique contour sections 116, in this direction of rotation, in which the spindle is initially turned further in the direction of rotation corresponding to the second axial direction 84. In order then to achieve a reversal in the direction of the nut 52 into the first axial direction 68, the nut 52 is first of all turned in such a way that the shift cam 56 is associated with an axial guide 66. The spindle 46 is then driven in the opposite direction of rotation. As a result, the projection 112, which is preferably designed as a ball, comes up against the blocking contour section 118, with the result that the nut 52 cannot turn in the opposite direction of rotation and is consequently held securely in the circumferential direction. The nut 52 is thereby forced to move in the first axial direction 68. The blocking contour section 118 and the preloading or overlap of the projections 112 are chosen in such a way that the nut 52 is held in the circumferential direction until the shift cam 56 has moved into the axial guide 66.

In order to make this easier, a suitable pair of chamfers 122 can be provided on the axial "mouth" of the axial guide 66, and the shift cam 56 can be designed in a corresponding manner with suitable chamfers 120 on the side facing the axial guide 66.

Figure 9:
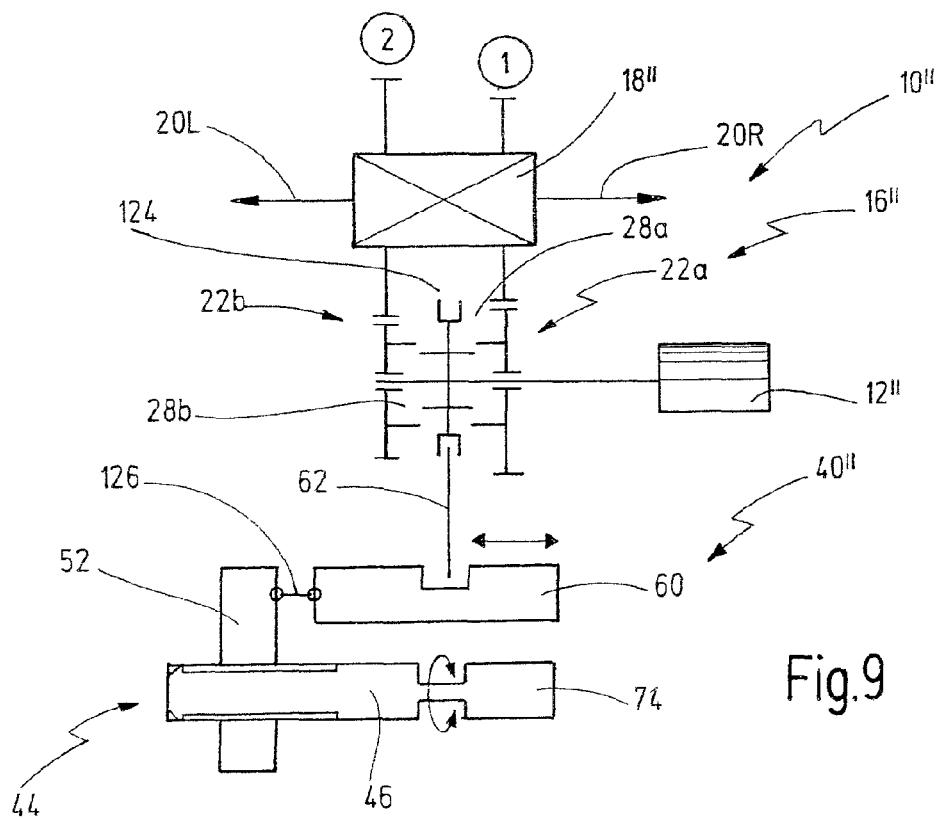
FIG. 9 shows a schematic illustration of a drive train in the form of a two-speed transmission having a further embodiment of a shift arrangement.

FIG. 9 shows another embodiment of a drive train 10". Drive train 10" has a drive motor 12", which can be designed as an electric motor, for example. In the present case, the transmission arrangement 16" has precisely two gear stages, which can be set up by means of two gear sets 22a, 22b, which can be engaged and disengaged by means of a first shift clutch 28a and of a second shift clutch 28b, more specifically in alternation. The shift clutches 28a, 28b are integrated into a shift clutch pack, which can be actuated by means of a single sliding sleeve, which is coupled to a push rod 60 by means of a coupling device 62. The gear sets 22a, 22b can have fixed gears, which are connected to a further shaft or are connected directly to an input member of a differential 18", and therefore in the present case the transmission has precisely two gear stages.

In this version, it is possible to actuate the shift clutch packs 124 implemented in this way by means of just one push rod 60, which is actuated by means of a spindle drive 44 having a spindle 46 and a nut 52, as in the above embodiments.

In the present case, however, it is possible to couple the nut 52 to the push rod 60 by means of a rigid coupling 126, thus enabling both pushing and pulling forces to be transmitted to the push rod 60 via the rigid coupling 126.

Such an embodiment of a shift arrangement 40" is also alternatively suitable for engaging and disengaging a parking lock arrangement.

Overall, it is possible to achieve at least one of the following advantages with the present invention, depending on the embodiment.

A selecting and a shifting function can be implemented by enabling/enforcing or preventing rotation of the nut with the spindle by means of just a single drive. The shift arrangement can optionally be expanded by additional functions, e.g. a park-by-wire parking lock arrangement. The shift arrangement can be implemented in a very simple and robust manner. The shift arrangement can be integrated very well into a transmission package. Moreover, the shift arrangement can easily be expanded for a plurality of gear stages, that is to say more than six gear stages or more than seven gear stages. Moreover, the shift arrangement can be expanded by additional functions (park-by-wire) in a simple manner, if required.

The overall result is simplicity of manufacture with a relatively large number of identical parts. Compared with an embodiment in which the gear stages are actuated by means of a shift drum or in some other way, the overall structure of the transmission can remain unaffected.

By virtue of its compact construction, it is conceivable to arrange the shift arrangement close to associated shift clutches and to make the shift forks and linkages to of the shift forks very short.

FIGS. 10 to 13 show another embodiment of a shift arrangement, which corresponds in respect of construction and operation to the shift arrangement in FIGS. 3 to 8. Identical elements are therefore indicated by identical reference signs. It is essentially the differences which are explained below.

Figure 10:
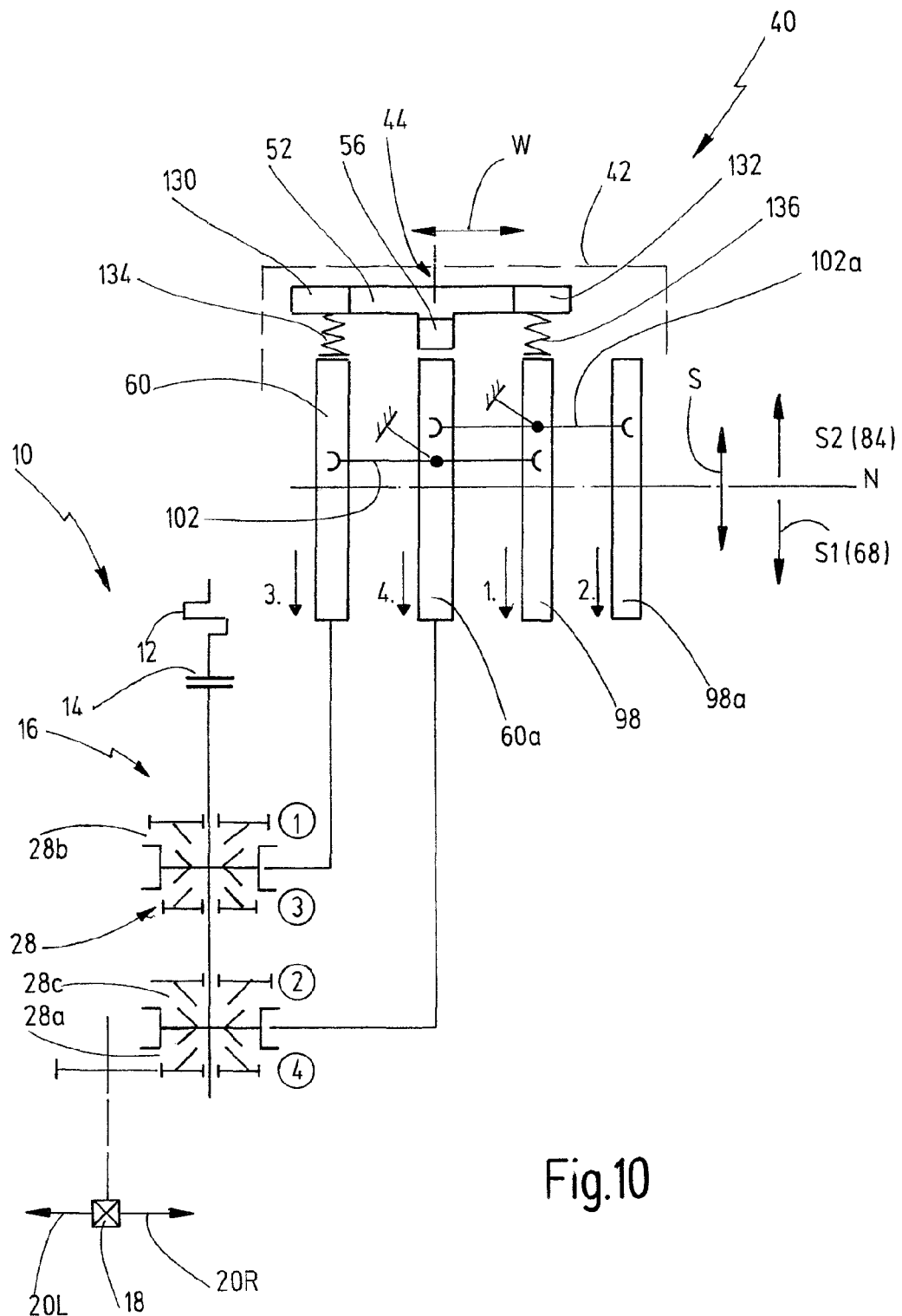
FIG. 10 shows a schematic illustration of one embodiment of a shift arrangement according to the invention.

The shift arrangement 40 in FIG. 10 is used to actuate gear stages 1 to 4 of an automated shift transmission, wherein a first push rod 60 is connected to a first shift clutch pack having shift clutches 28, 28b for gear stages 1, 3 and wherein a second push rod 60a is connected to a shift clutch pack, which has shift clutches 28a, 28c for gear stages 4, 2.

Push rod 60 is coupled to a return rod 98, namely by means of a coupling device, which has a lever 102, for example. In a corresponding manner, the second push rod 60a is coupled to a return rod 98a by means of another coupling device, which has a lever 102a, for example.

A shift member 52 can be moved in a direction transverse to shifting direction S, as shown in FIG. 10 at W. In particular, the transverse movement can be a rotary movement, in which case the shift member 52 is preferably designed as a nut of a spindle drive, as described above.

In addition to the shift cam 56, the shift member 52 has a first driving feature 130 and a second driving feature 132. The driving features 130, 132 are preferably arranged on opposite sides of the shift cam 56, as seen in transverse direction W. The first driving feature 130 is coupled to a first spring device 134. The second driving feature 132 is coupled to a second spring device 136.

The driving features 130, 132 or the spring devices 134, 136 thereof are arranged in such a way, as seen in transverse direction W, that, when one push rod is selected (push rod 60a in FIG. 10), the driving features or the spring devices thereof are aligned with adjacent rods (in this case push rod 60 and return rod 98), as seen in transverse direction W.

The driving features are used to transmit a pushing force to unselected rods (in this case 60, 98) before or during a shift operation on a selected rod (in this case push rod 60a, for example) in order to move said rods into the neutral position N.

This is shown by way of example by means of FIGS. 11 to 15, which, starting from the illustration in FIG. 10, first of all show the engagement of a forward gear stage 4 and then the engagement of a forward gear stage 1.

In FIG. 11, starting from the illustration in FIG. 10, the shift member 52 is moved in the first axial direction 68 in order to move push rod 60a into the first shift position S1, in which gear stage 4 is engaged.

To engage gear stage 1, the shift member 52 is first of all moved back in the second shifting direction 84 as shown in FIG. 12, namely to the extent that the spring devices can be moved behind return rod 98a, which is being moved in the opposite direction, the spring devices being moved in transverse direction W, as shown in FIG. 13.

In FIG. 13, the shift cam is aligned in transverse direction W with return rod 98 in order to engage forward gear stage 1. The spring devices 134, 136 are furthermore aligned with push rod 60a of source gear stage 4 and the associated return rod 98a.

The shift member 52 is then moved back in the first shifting direction, as shown at 68 in FIG. 14. Through the action of the springs, of which spring device 136 acts on return rod 98a, return rod 98a and, by virtue of the coupling, also push rod 60a are moved into the neutral position, as illustrated in FIG. 14. By continuing the movement of the shift member in the first axial direction 68, forward gear stage 1 can then be engaged, as shown in FIG. 15, during which process the spring devices are compressed, as is likewise illustrated in FIG. 15.

FIGS. 16 and 17 show by way of example a spring device 134, which has a compression spring 138, which is arranged between a plate 140 and driving feature 130. The plate 140 is connected to a tappet 142, which is guided in driving feature 130, more specifically in a manner limited by a stop 144, which defines the spring travel 146 of spring device 134. If appropriate, a second stop can be provided, as illustrated in FIGS. 16 and 17, avoiding a situation where compression spring 138 can be fully compressed.

Figure 18:
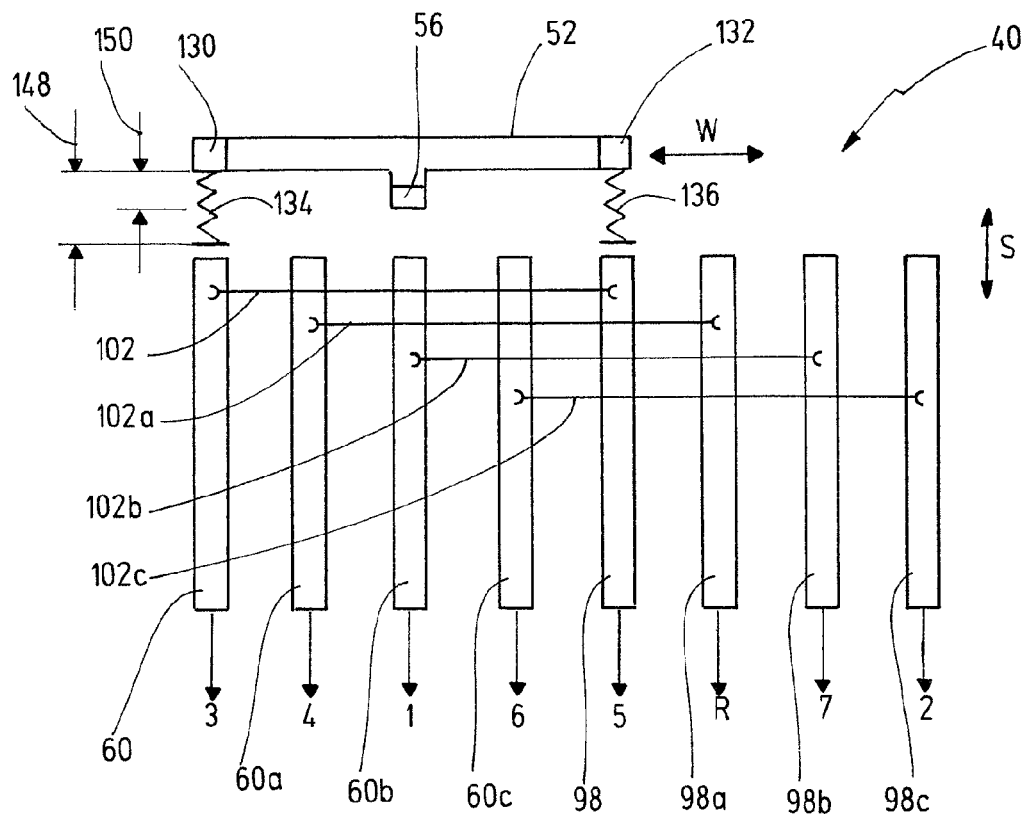
FIG. 18 shows a schematic illustration of another embodiment of a shift arrangement for a dual clutch transmission, more specifically in a developed illustration.
Figure 19:
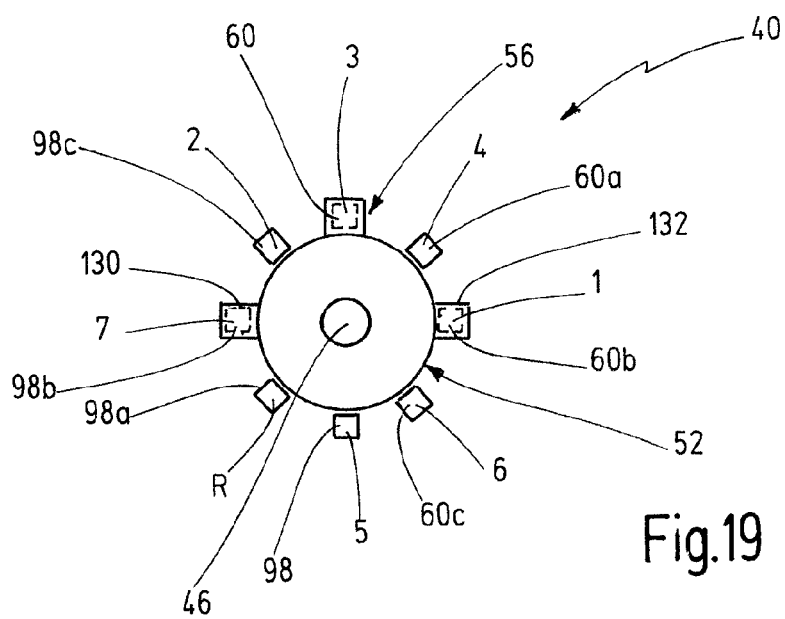
FIG. 19 shows a schematic axial plan view of the shift arrangement of FIG. 18.

FIGS. 18 and 19 show another shift arrangement 40, which corresponds generally to the shift arrangement 40 in FIGS. 10 to 15 in respect of construction and operation. Identical elements are therefore indicated by identical reference signs.

The shift arrangement 40 in FIGS. 18 and 19 is used to actuate a dual clutch transmission having two transmission sections, of which the first transmission section is assigned to gear stages 1, 3, 5, 7, and of which the second transmission section is assigned to gear stages 2, 4, 6, R.

FIG. 18 in turn shows a schematic development of this shift arrangement 40, and FIG. 19 shows a schematic axial view. It can be seen that the shift arrangement 40 has a push rod 60 for engaging forward gear stage 3, a push rod 60a for engaging forward gear stage 4, a push rod 60b for engaging forward gear stage 1, a push rod 60c for engaging forward gear stage 6, a return rod 98 for engaging forward gear stage 5, a return rod 98a for engaging the reverse gear stage R, a return rod 98b for engaging forward gear stage 7 and a return rod 98c for engaging forward gear stage 2. The following rods are coupled by respective coupling devices with respective levers 102, 102a, 102b, 102c: 60 to 98, 60a to 98a, 60b to 98b and 60c to 98c.

Rods 60, 98 are arranged in such a way in the circumferential direction that one push rod or return rod of one transmission section is in each case adjacent to one push rod or return rod of the other transmission section.

As shown in FIG. 19, push rod 60 is likewise adjacent to return rod 98c in the circumferential direction.

The shift member 52 has a shift cam 56 and two driving features 130, 132, which are spaced apart from the shift cam 56 in transverse direction W in such a way that, in relation to the shift cam 56, they are each aligned with the next rod but one, as seen in the circumferential direction or in transverse direction W. In the illustration in FIG. 18, the shift cam 56 is aligned with the push rod 60b for forward gear stage 1, and driving feature 130 or the spring device 134 thereof is aligned with the push rod 60 for forward gear stage 3, and driving feature 132 or the spring device 136 thereof is aligned with the return rod 98 for engaging forward gear stage 5.

Consequently, the shift cam 56 and the driving features 130, 132 in this arrangement are each aligned exclusively with those rods which are respectively assigned to one transmission section It is thus possible in a dual clutch transmission to ensure that, when a target gear stage is engaged within the respective transmission section in question, any source gear stages in the same transmission section are disengaged by means of the driving features 130, 132 and the associated spring devices 134, 136.

FIG. 18 furthermore shows, at 148, an overhang, by which the spring devices 134, 136 project relative to the shift cam 56 in shifting direction S. 150 indicates the travel which corresponds to a shift travel from the neutral position to a shift position S1, and which is preferably equal to or less than the spring travel 146.

The invention claimed is:

1. Shift arrangement for a motor vehicle transmission which has at least two gear stages that can be engaged and disengaged by means of different rods, having
   a housing,
   at least two push rods, which are mounted on the housing in such a way as to be movable in an axial direction between a neutral position and at least one shift position and which can each be coupled to a shift clutch or a shift clutch pack,
   at least two return rods, which are mounted on the housing in such a way as to be movable in an axial direction between a neutral position and at least one shift position, wherein the return rods are each coupled to one of the push rods in such a way that any one of the push rods and the return rod associated therewith are moved in opposite axial directions, and
   a shift member, which is mounted on the housing in such a way that a shift cam of the shift member can be aligned with one of the push rods or with one of the return rods for the purpose of selecting, and can transmit a pushing force to the selected rod and move the selected rod in a first axial direction for a shift operation,
wherein
at least one driving feature is furthermore arranged on the shift member in such a way that, before or during a shift operation on a selected rod, the driving feature can transmit a pushing force to at least one unselected rod in order to move said unselected rod into the neutral position.

2. Shift arrangement according to claim 1, wherein two driving features are arranged on the shift member in such a way that, before or during the shift operation on the selected rod, the driving features can transmit a pushing force to an unselected rod and to the return rod associated therewith in order to move the unselected rod and the return rod associated therewith into the neutral position.

3. Shift arrangement according to claim 1, wherein the driving feature or features are each connected to a spring device, wherein the spring device is arranged and designed in such a way that the pushing force can be transmitted from the driving feature to at least one of the unselected rod and the rod associated therewith via the spring device.

4. Shift arrangement according to claim 3, wherein a spring travel of the spring device is equal to or greater than a travel of a rod from the neutral position to the shift position.

5. Shift arrangement according to claim 3, wherein the spring device and the shift cam are arranged relative to one another in such a way, as seen in the axial direction, that a pushing force is transmitted from the driving feature or driving features to the unselected rod or rods via the spring device before the shift cam exerts a pushing force on the selected rod, thus ensuring that a shift clutch of a source gear stage is opened before a shift clutch of a target gear stage associated with the selected rod is closed.

6. Shift arrangement according to claim 1, wherein at least one other push rod or return rod is arranged between the one of the push rods and the return rod associated therewith, as seen in a direction transverse to the axial direction.

7. Shift arrangement according to claim 1, wherein the shift member can be turned about a longitudinal axis for the purpose of selecting, wherein the push rods and the return rods are arranged in a manner distributed in the circumferential direction around the longitudinal axis.

8. Shift arrangement according to claim 7, wherein the one of the push rods and the return rod associated therewith are arranged diametrically in relation to the longitudinal axis.

9. Shift arrangement according to claim 1, wherein the motor vehicle transmission is an automated shift transmission.

10. Shift arrangement according to claim 9, wherein the shift member has the at least one driving feature for all the unselected push rods and the return rods associated therewith, with the result that, when one gear stage is engaged, all the other gear stages of the motor vehicle transmission are locked by means of the driving features.

11. Shift arrangement according to claim 1, wherein the motor vehicle transmission is a dual clutch transmission, which has a first transmission section and a second transmission section, wherein the shift arrangement has the at least two push rods and the at least two return rods for both transmission sections, which can be actuated by means of the one shift member.

12. Shift arrangement according to claim 11, wherein the shift member can be turned about a longitudinal axis for the purpose of selecting, wherein the push rods and the return rods are arranged in a manner distributed in the circumferential direction around the longitudinal axis, wherein, as seen over the circumference, one push rod or return rod of one transmission section is adjacent to one push rod or return rod of the other transmission section.

13. Shift arrangement according to claim 1, wherein the shift member is designed as a nut, which, together with a spindle, forms a spindle drive.

\* \* \* \* \*